March 26, 1963 G. F. UNDERHAY ETAL Re. 25,358

PROCESS OF AND APPARATUS FOR PAPERMAKING

Original Filed April 15, 1955 2 Sheets-Sheet 1

INVENTORS:
GEORGE FLAXMAN UNDERHAY,
JOHN NEIL FRANKLIN, and
ARCHIBALD HOWARD WELLS BY Baldwin & Wright
ATTORNEYS March 26, 1963 G. F. UNDERHAY ETAL Re. 25,358
PROCESS OF AND APPARATUS FOR PAPERMAKING
Original Filed April 15, 1955 2 Sheets-Sheet 2
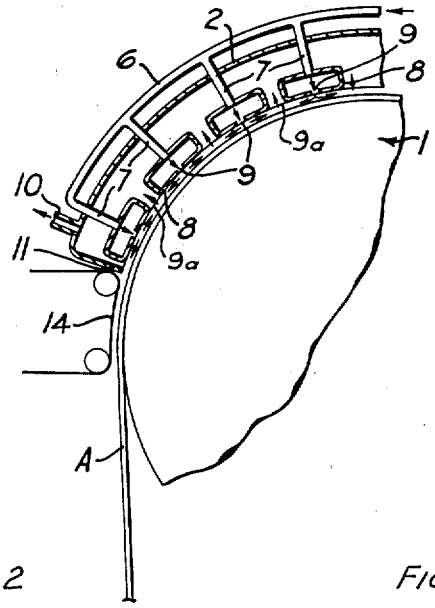
FIG. 2
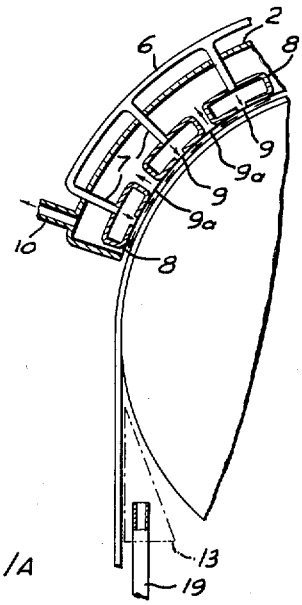
FIG. 1A
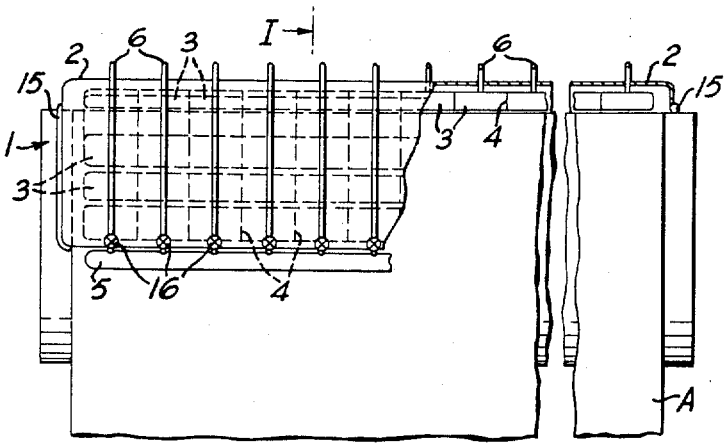
I FIG. 3.
INVENTORS:
GEORGE FLAXMAN UNDERHAY,
JOHN NEIL FRANKLIN and
ARCHIBALD HOWARD WELLS
BY Baldwin & Wight
ATTORNEYS United States Patent Office Re. 25,358
Reissued Mar. 26, 1963

25,358

PROCESS OF AND APPARATUS FOR PAPERMAKING

George Flaxman Underhay, Weybridge, England, John Neil Franklin, Baie d'Urfe, Montreal, Canada, and Archibald Howard Wells, Gravesend, England, assignors to Bowater Research and Development Company, Limited, London, England Original No. 2,919,495, dated Jan. 5, 1960, Ser. No. 501,615, Apr. 15, 1955. Application for reissue Sept. 27, 1961, Ser. No. 142,452
Claims priority, application Great Britain Apr. 15, 1954
10 Claims. (Cl. 34—23)

Matter enclosed in heavy brackets [ ] appears in the original patent but forms no part of this reissue specification; matter printed in italics indicates the additions made by reissue.

This invention relates to a process of and apparatus for papermaking, more particularly to that stage of a papermaking process in which the wet web is dried.

In a typical papermaking machine the paper web, after leaving the wire, is passed, supported by felts, between press rolls with or without internal suction boxes, so that the web is subjected to pressure and also, in many cases, to vacuum to consolidate it and remove water. After leaving the press part of the machine the normal procedure is to pass the web, *having a high moisture content and* still containing some 60 to 70% moisture, over a relatively large number of drying cylinders arranged in such a way that each side of the paper alternately comes in contact with the surface of the drying cylinders, the contact being made as intimate as possible by means of felts which press the paper against the drying cylinders. This pressing action helps to promote the transfer of heat to the paper and thus the rate of drying is increased.

Dryer felts are designed to have two opposing qualities, they are designed to be porous to allow for the passage of air and water vapour and they are also made absorptive to help carry away some of the moisture from the web. It is found, however, that felts, even under the best possible operating conditions including the provision of adequate felt dryers, hinder the ventilation of the web [and thus slow down the rate of water removal].

The object of the invention is to provide a process of papermaking in which the paper web is dried more rapidly and under better control than has been possible heretofore.

This object is achieved, according to the invention, by a process of papermaking in which the paper web is dried by entrainment around a plurality of heated drying cylinders wherein the web is maintained in close but non-adhesive contact with [the] *a* cylinder [surfaces] *surface* by the force of air acting on the exposed surface of the web, the air being caused to flow over the exposed surface and thus helping to remove moisture expelled from the web by the action of the heated [cylinders] *cylinder*.

The main advantages of the process according to the invention are:

a. Due to the increased rate of drying the overall size of the drying section of a papermaking machine employing the above process may be made smaller than those used at present.

b. As a consequence of the paper being exposed on one side to the atmosphere or to the air flow all or substantially all the time it is being heated, the removal of moisture across the width of the sheet will be much more readily controllable enabling the finished sheet to have a moisture content substantially uniform across the full width even before the paper is dampened, should this be necessary for any reason.

c. The paper, *passing over and with one face of the web in contact with only a drying cylinder, and with*

*the other face of the web exposed to air flow,* can more easily be allowed to shrink naturally during the drying process and therefore it will possess stretching properties which will reduce the risk of rupture under tensile stress.

In the [preferred] process the [main] *general direction* of air flow [is in] *may be* [a direction] *generally* opposite to [and parallel with] the direction of movement of the web.

The invention also provides a drying section for a papermaking machine which comprises a [plurality of] heated drying [cylinders] *arrangement* around which the web to be dried will be entrained, *a hood or* hoods arranged circumferentially with respect to [some at least of the] *one or more drying* cylinders, means for urging the web into close but non-adhesive contact with [each] *the hooded* cylinder *or cylinders* as the web is about to enter under a hood *or hoods,* and means for forcing air through the *hood or* hoods to flow over the exposed surface of the web and maintain it in close non-adhesive contact with the *hooded* cylinder *or cylinders* so as to remove the moisture expelled from the web.

In certain instances the shrinkage of the paper during drying provides a tension in the web which has the effect of assisting in holding the web in contact with the *cylinder or* cylinders. This effect [is] *appears to be* most pronounced *in some cases* when the web has dried to the point where its moisture content is around 25 to 35 percent.

The force exerted on the exposed surface of the web is only sufficient to maintain the web in contact with the *cylinder or* cylinders and is not so great as to cause the web to stick to the *cylinder or* cylinders as is usual in the maunfacture of glazed papers.

Preferably the *hood or* hoods *is or* are divided into a plurality of sections parallel to the direction of movement of the web and each section is provided with a plurality of circumferentially spaced air ducts having orifices for directing air into the web and connected through a control valve to a suitable air supply.

The means for initially urging the web into contact with [each] *a* cylinder may comprise either a nip roll or a felt acting in conjunction with the cylinder, or a suction device adapted to create a partial vacuum in the wedge-shaped space where the web meets the cylinder.

An embodiment of the invention will now be described by way of example with reference to the accompanying drawings wherein:

*FIGURE 1A is a fragmentary elevation showning some of the parts illustrated in FIGURE 1, but including a modified arrangement for insuring that the paper web, when it comes to a drying cylinder, will get closely into contact with the cylinder,*

FIGURE 2 shows in section on enlarger scale a modified form of a portion of the machine shown in FIGURE 1, and FIGURE 3 shows, partly in section, an end view of part of the machine taken in the direction of the arrow III in FIGURE 1, certain parts being omitted for clarity.

Figure 1:
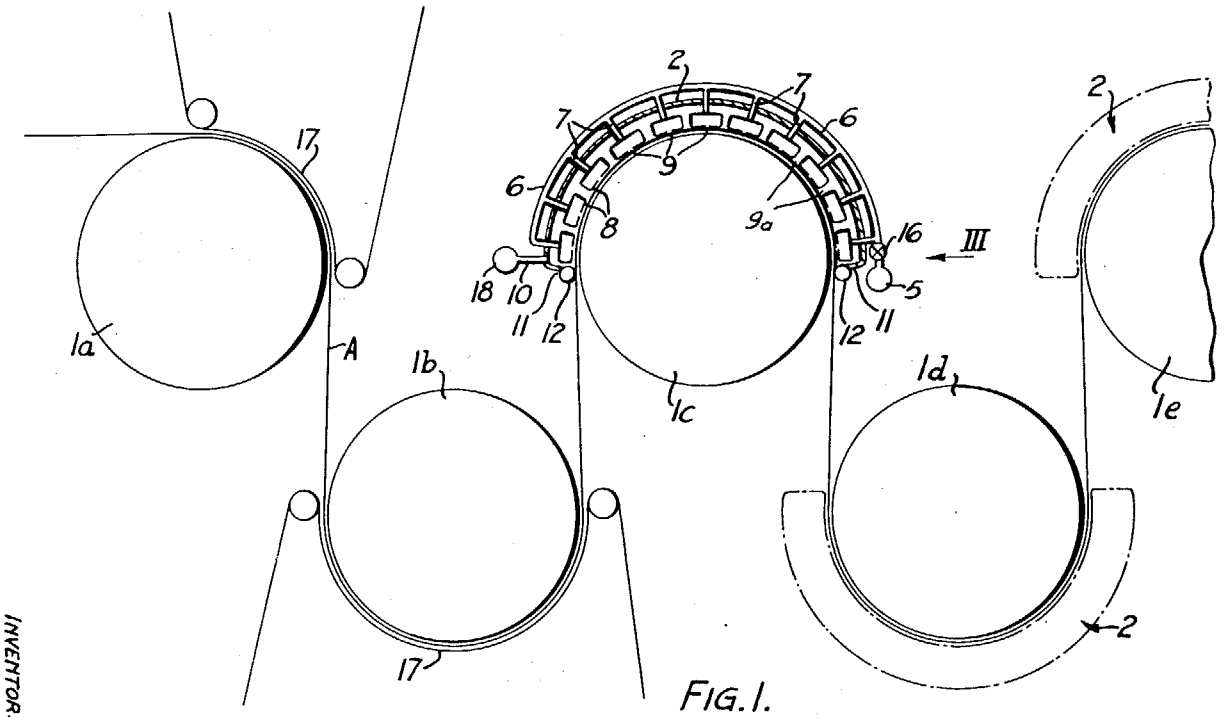
FIGURE 1 shows diagrammatically an elevation of part of the drying section of a papermaking machine in accordance with the invention, partly in section on the line I—I in FIGURE 3.

The drying section of a papermaking machine comprising several rotatable heated cylinders 1a, 1b, 1c . . ., five only being shown in FIGURE 1, of a larger diameter than are normally used. A convenient diameter may be, for example, between eight and twelve feet. The cylinders are arranged at two levels, the center of a cylinder at one level being midway between the centers of the adjacent two cylinders at the other level as is clearly shown in FIGURE 1. The paper web A is entrained about *and*

*passes over* the first two cylinders 1a, 1b *transversely to the cylinder axes* with supporting felt 17 *passes, otherwise unsupported,* and about the remaining cylinders without the use of felts and the portion of the circumference of each of the remaining cylinders 1c, 1d, 1e . . . with which the web is in contact is surrounded by a [hood 2.] *hood means 2 circumferentially embracing at least in part the portion of the cylinder over which the web is entrained.* Each hood 2 is divided into sections, *that is, zones or chambers* 3 as shown in FIGURE 3 by partitions 4 running in the direction of the paper web *and being spaced apart in the direction of the cylinder axis;* and the number of sections may be as great as twelve or so, *depending on the width of the machine,* so that the air conditions applying over different portions of the width of the paper may be independently controlled [.] *within the separated chambers 3 deployed across the cylinder in the direction of the cylinder axis and respectively embracing correspondingly deployed parts of the web.*

An air *inlet flow means, as shown a* supply manifold [5] *means 5 common to the several chambers 3* is provided adjacent each hood 2 and axially parallel therewith and from each manifold 5 distributor pipes 6 are carried over the hood in a direction substantially parallel to the direction of motion of the web A on the cylinder. A control valve 16 is provided for each distributor pipe 6 [.] *for individually and differentially controlling the flow of air in the several chambers 3 in contact with the cylinder-entrained web.* There is a distributor pipe 6 corresponding to each section 3 disposed substantially centrally with respect to the section, and from each pipe 6 further connecting pipes 7 connect the distributor pipe to a number of ducts 8 within the hood 2, each duct having *an air inlet opening facing toward the cylinder-entrained web, as shown* an orifice 9 arranged to direct air within the duct, and fed from the manifold 5 through the distributor and connecting pipes 6, 7, onto the outer surface of the web A as it passes over the surface of the cylinder. *Air outlet openings 9a facing away from the cylinder-entrained web are provided by the spaces between adjacent ducts 8, the sets of inlet and outlet openings in each chamber being deployed circumferentially of the cylinder in spaced relation to one another, and the air outlet openings of one set being interspersed between the air inlet openings of the other set.*

Adjacent the main edge of each hood 2, at which the paper web A enters, an exhaust pipe *i.e. duct* 10 connects each section 3 to an *air outlet flow means, as shown an* exhaust manifold *duct* 18 [.] *common to the several chambers 3.* The exhausted air may be allowed to pass out to the atmosphere or it may be re-circulated to the supply manifold through suitable drying and compressing means for re-use. *Air which has been removed from the hoods and recirculated through drying means for re-use will be in a more dry state when re-used than when removed from the hoods.*

The partitions 4 of each hood 2 extend as close to the paper web A as normal engineering practice will permit, but it is by no means essential that leakage from one section 3 to another should be avoided [.] , *provided the air inlet flow means 5 and the air outlet flow means 18 communicate separately with the chambers 3 independently of flow of air from chamber-to-chamber.*

Seals at the main edges of the hood 2 parallel to the axis of the cylinder may be produced by providing these edges with a flexible doctor blade or rubbing strip 11 and positioning this to bear on a roll 12 which itself is bearing on the paper on the drying cylinder. One of the rolls 12 may constitute a nip roll to bring the paper web A entering upon the drying cylinder into close contact with the cylinder.

Instead of using a nip roll to ensure that the paper, when it comes to a drying cylinder, will get closely into contact with the cylinder there may be employed means *indicated at 19 in FIGURE 1A* for sucking air out of the wedge-shaped space 13 between the paper and the drying cylinder.

In a modification, a short length of felt 14 may be provided as shown in FIGURE 2 to bring the web onto the cylinder surface, the hood being sealed by a flexible doctor blade 11 as before.

The side edges of each hood are sealed by resilient members 15 bearing on the surface of the cylinder thereunder.

The air which is forced through the hoods is at a pressure above atmospheric pressure, a suitable value being of the order of about 0.5 lb. per square inch, or possibly less.

An important feature of the invention is that it will allow the amount of air used for removing the water from the web to be closely controlled by means of the valves 16 across the width of the web A. The amount of air admitted to each section of the hood and the temperature of the supply is controllable enabling, for example, more air to be sent to the middle of the machine, where paper often tends to be more difficult to dry, and less air to either or both the edges where the paper may dry more quickly.

It will be appreciated that the process according to the invention may be applied to existing papermaking machines and that although drying cylinders of larger diameter than normal are preferred, normal sized cylinders may be used.

We claim:

[1. A drying section for a papermaking machine comprising a plurality of heated drying cylinders around which the paper web to be dried will be entrained, a plurality of hoods arranged circumferentially with respect to at least some of the cylinders, means for urging the web into close but non-adhesive contact with each of said hooded cylinders as the web is about to enter under the hood, a plurality of partitions spaced apart along the length of each hooded cylinder within the associated hood and dividing the hood into a plurality of sections, a plurality of separate air supply pipes associated with each of said sections, and a plurality of separate ducts within each section, each of said ducts being connected to a different one of said air supply pipes and having a discharge orifice in proximal relationship to the associated hooded cylinder and each of said ducts providing an air chamber enlarged in relation to the associated air supply pipe and discharge orifice.]

[2. A drying section for a papermaking machine comprising a plurality of heated drying cylinders around which the paper web to be dried will be entrained, a plurality of hoods arranged circumferentially with respect to at least some of the cylinders, means for urging the web into close but non-adhesive contact with each of said hooded cylinders as the web is about to enter under the hood, a plurality of partitions spaced apart along the length of each hooded cylinder within the associated hood and dividing the hood into a plurality of sections, a plurality of separate air supply pipes associated with each of said sections, a plurality of separate ducts within each section, each of said ducts being connected to a different one of said air supply pipes and having a discharge orifice in proximal relation to the associated hooded cylinder and each of said ducts providing an air chamber enlarged in relation to the associated air supply pipe and discharge orifice, a plurality of distributor pipes respectively connected to the air supply pipes associated with said sections, and separate valves for individually controlling the flow of air into said distributor pipes.]

[3. A drying section for a papermaking machine comprising a plurality of heated drying cylinders around which the paper web to be dried will be entrained, a plurality of hoods arranged circumferentially with respect to at least some of the cylinders, means for urging the web into close but non-adhesive contact with each of said hooded cylinders as the web is about to enter under the hood, a plurality of partitions spaced apart along the length of each hooded cylinder within the associated hood and dividing the hood into a plurality of sections, a plurality of separate air supply pipes associated with each of said sections, a plurality of separate ducts within each section, each of said ducts being connected to a different one of said air supply pipes and having a discharge orifice in proximal relationship to the associated hooded cylinder and each of said ducts providing an air chamber enlarged in relation to the associated air supply pipe and discharge orifice, sealing means along the edges of the hoods adjacent the surfaces of the hooded cylinders for preventing egress of air from said hoods, and exhaust manifold means for receiving air to be discharged from within said hoods.]

4. A drying section for a papermaking machine comprising a plurality of heated drying cylinders around which the paper web to be dried will be entrained, a plurality of hoods arranged circumferentially with respect to at least some of the cylinders, a plurality of partitions spaced apart along the length of each hooded cylinder within the associated hood and dividing the hood into a plurality of sections, a plurality of separate air supply pipes associated with each of said sections, and a plurality of separate ducts within each section, each of said ducts being connected to a different one of said air supply pipes and having a discharge orifice in proximal relationship to the associated hooded cylinder and each of said ducts providing an air chamber enlarged in relation to the associated air supply pipe and discharge orifice.

5. A drying section for a papermaking machine comprising a plurality of heated drying cylinders around which the paper web to be dried will be entrained, a plurality of hoods arranged circumferentially with respect to at least some of the cylinders, a plurality of partitions spaced apart along the length of each hooded cylinder within the associated hood and dividing the hood into a plurality of sections, a plurality of separate air supply pipes associated with each of said sections, a plurality of separate ducts within each section, each of said ducts being connected to a different one of said air supply pipes and having a discharge orifice in proximal relation to the associated hooded cylinder and each of said ducts providing an air chamber enlarged in relation to the associated air supply pipe and discharge orifice, a plurality of distributor pipes respectively connected to the air supply pipes associated with said sections, and separate valves for individually controlling the flow of air into said distributor pipes.

[6. A drying section for a papermaking machine comprising a plurality of heated drying cylinders around which the paper web to be dried will be entrained, a plurality of hoods arranged circumferentially with respect to at least some of the cylinders, a plurality of partitions spaced apart along the length of each hooded cylinder within the associated hood and dividing the hood into a plurality of sections, a plurality of separate air supply pipes associated with each of said sections, a plurality of separate ducts within each section, each of said ducts being connected to a different one of said air supply pipes and having a discharge orifice in proximal relationship to the associated hooded cylinder and each of said ducts providing an air chamber enlarged in relation to the associated air supply pipe and discharge orifice, sealing means along the edges of the hoods adjacent the surfaces of the hooded cylinders for preventing egress of air from said hoods, and exhaust manifold means for receiving air to be discharged from within said hoods.]

*7. In apparatus for drying a paper web in a papermaking machine, a cylinder around a substantial portion of which a paper web to be dried is to be entrained and passed thereover transversely to the cylinder axis; hood means circumferentially embracing, at least in part, the portion of said cylinder over which the web is to be entrained and enclosing a plurality of air flow zones deployed across the cylinder in the direction of the cylinder axis and respectively embracing correspondingly deployed parts of the cylinder-entrained web; air inlet flow means communicating with said zones; air outlet duct means communicating with said zones individually at locations spaced axially of said cylinder whereby to remove air from the respective zones individually without substantial air flow in contact with the web from zone-to-zone axially of said cylinder; and means for delivering air to said air inlet flow means to flow upon the portion of the web entrained around and in contact with said cylinder under pressure sufficient to maintain said web portion in non-adhesive contact with said cylinder and for individually and differentially controlling air flowing within said zones in contact with the cylinder-entrained web as the latter passes over said cylinder.*

*8. In apparatus for drying a paper web in a papermaking machine, a cylinder around a substantial portion of which a paper web to be dried is to be entrained and passed thereover transversely to the cylinder axis; hood means circumferentially embracing, at least in part, the portion of said cylinder over which the web is to be entrained and enclosing a plurality of air flow zones deployed across the cylinder in the direction of the cylinder axis; a plurality of air inlet openings communicating with each of said air flow zones, being deployed circumferentially of said cylinder and facing toward said cylinder-entrained web for delivering air against the web where the latter is in contact with said cylinder; a plurality of air outlet openings communicating with each of said air flow zones, being deployed circumferentially of said cylinder, facing away from said cylinder-entrained web and being interspersed between said air inlet openings; and means for controlling the air drying of said web differentially across the web in said air flow zones.*

*9. In apparatus for drying a paper web in a papermaking machine, a cylinder around a substantial portion of which a paper web to be dried is to be entrained and passed thereover transversely to the cylinder axis; hood means circumferentially embracing, at least in part, the portion of said cylinder over which the web is to be entrained; a plurality of partitions within said hood extending transversely of said cylinder axis, being spaced apart in the direction of extent of the cylinder axis and providing a plurality of separated chambers deployed across the cylinder in the direction of the cylinder axis and respectively embracing correspondingly deployed parts of the cylinder-entrained web; air inlet flow means communicating separately with said chambers independently of flow of air from any of said chambers to others thereof; air outlet duct means communicating with said chambers individually at locations spaced axially of said cylinder whereby to remove air from the respective chambers individually without substantial air flow in contact with the web from chamber-to-chamber axially of said cylinder; means for delivering air to said air inlet flow means for delivery to said chambers and upon the portion of the web entrained around and in contact with said cylinder under pressure sufficient to maintain said web portion in non-adhesive contact with said cylinder; and means for individually and differentially controlling the flow of air through said chambers in contact with the web.*

*10. In apparatus for drying a paper web in a papermaking machine, a cylinder around a substantial portion of which a paper web to be dried is to be entrained and passed thereover transversely to the cylinder axis; hood means circumferentially embracing, at least in part, the portion of said cylinder over which the web is to be entrained; a plurality of partitions within said hood extending transversely of said cylinder axis, being spaced apart in the direction of extent of the cylinder axis and*

*providing a plurality of separated chambers deployed across the cylinder in the direction of the cylinder axis and respectively embracing correspondingly deployed parts of the cylinder-entrained web; air inlet flow means communicating separately with said chambers independently of flow of air from any of said chambers to others thereof; air outlet duct means communicating with said chambers individually at locations spaced axially of said cylinder whereby to remove aid from the respective chambers individually without substantial air flow in contact with the web from chamber-to-chamber axially of said cylinder; and means for individually and differentially controlling air flowing within said chambers in contact with the cylinder-entrained web as the latter passes over said cylinder.*

*11. In apparatus for drying a paper web in a papermaking machine, a cylinder around a substantial portion of which a paper web to be dried is to be entrained and passed thereover transversely to the cylinder axis; hood means circumferentially embracing, at least in part, the portion of said cylinder over which the web is to be entrained; a plurality of partitions within said hood extending transversely of said cylinder axis, being spaced apart in the direction of extent of the cylinder axis and providing a plurality of separated chambers deployed across the cylinder in the direction of the cylinder axis and respectively embracing correspondingly deployed parts of the cylinder-entrained web; air inlet flow means communicating separately with said chambers independently of flow of air from any of said chambers to others thereof; air outlet duct means communicating with said chambers individually at locations spaced axially of said cylinder whereby to remove air from the respective chambers individually without substantial air flow in contact with the web from chamber-to-chamber axially of said cylinder; and separate valves connected respectively between individual chambers and said air inlet flow means for individually controlling the flow of air within each chamber in contact with the cylinder-entrained web.*

*12. In apparatus for drying a paper web in a papermaking machine, a cylinder around a substantial portion of which a paper web to be dried is to be entrained and passed thereover transversely to the cylinder axis; hood means circumferentially embracing, at least in part, the portion of said cylinder over which the web is to be entrained; a plurality of partitions with said hood extending transversely of said cylinder axis, being spaced apart in the direction of extent of the cylinder axis and providing a plurality of separated chambers deployed across the cylinder in the direction of the cylinder axis and respectively embracing correspondingly deployed parts of the cylinder-entrained web; a set of air inlet openings within each of said chambers deployed circumferentially of said cylinder in spaced relation to one another and facing toward the cylinder-entrained web for delivering air thereagainst in circumferentially separated streams flowing inwardly toward said cylinder-entrained web; a set of air outlet openings within each of said chambers deployed circumferentially of said cylinder in spaced relation to one another, facing away from the cylinder-entrained web and being interspersed between the air inlet openings in the associated chamber for removing air from the cylinder-entrained web outwardly with respect to said cylinder; means for delivering air to the air inlet openings of the several chambers; duct means for exhausting air from the respective sets of air outlet openings of the several chambers individually at locations spaced axially of said cylinder whereby to remove air from the respective chambers individually without substantial air flow in contact with the web from chamber-to-chamber axially of said cylinder; and means for controlling the flow of air in the respective chambers.*

*13. In apparatus for drying a paper web in a papermaking machine, a cylinder around a substantial portion of which a paper web to be dried is to be entrained and passed thereover transversely to the cylinder axis; hood means circumferentially embracing, at least in part, the portion of said cylinder over which the web is to be entrained; a plurality of partitions within said hood extending transversely of said cylinder axis, being spaced apart in the direction of extent of the cylinder axis and providing a plurality of separated chambers deployed across the cylinder in the direction of the cylinder axis and respectively embracing correspondingly deployed parts of the cylinder-entrained web; a set of air inlet openings within each of said chambers deployed circumferentially of said cylinder in spaced relation to one another and facing toward the cylinder-entrained web for delivering air thereagainst in circumferentially separated streams flowing inwardly toward said cylinder entrained web; a set of air outlet openings within each of said chambers deployed circumferentially of said cylinder in spaced relation to one another, facing away from the cylinder-entrained web and being interspersed between the air inlet openings in the associated chamber for removing air from the cylinder-entrained web outwardly with respect to said cylinder; common means for delivering air to the air inlet openings of the several chambers; common duct means for exhausting air from the air outlet openings of the several chambers individually at locations spaced axially of said cylinder whereby to remove air from the respective chambers individually without substantial air flow in contact with the web from chamber-to-chamber axially of said cylinder; and separate valves connected respectively between one of said common means and one of the sets of openings within each of said chambers for individually controlling the flow of air in contact with different portions of said web passing respectively through said across-the-cylinder deployed chambers.*

*14. In a method of drying a paper web in a papermaking machine, passing the web over a drying cylinder; delivering air upon the surface of the portion of the web in contact with the cylinder in separate zones deployed axially of the cylinder so as to remove moisture from the web and to apply sufficient pressure to the said surface of the web to maintain the web in close non-adhesive contact with the cylinder; removing the moisture laden air from said zones individually after said air has passed over said surface of said web whereby the air is removed from contact with the web without substantial air flow over the web from zone-to-zone, re-delivering upon said web air which has been removed therefrom but which is in a more dry state than when removed, and individually and differentially controlling the flow of air in said zones in contact with the web axially of the cylinder.*

References Cited in the file of this patent or the original patent

UNITED STATES PATENTS

| | | |
|---|---|---|
| 1,129,156 | Woodsome | Feb. 23, 1915 |
| 1,438,211 | Baetz | Dec. 12, 1922 |
| 1,470,953 | Bassler | Oct. 16, 1923 |
| 1,724,645 | De Long | Aug. 13, 1929 |
| 1,738,641 | Cowan | Dec. 10, 1929 |
| 1,830,287 | Ohlin | Nov. 3, 1931 |
| 1,995,999 | Oxian | Mar. 26, 1935 |
| 2,022,593 | Fuykers | Nov. 26, 1935 |
| 2,166,379 | Skagerberg | July 18, 1939 |
| 2,218,282 | Downs | Oct. 15, 1940 |
| 2,304,818 | Grupe | Dec. 15, 1942 |
| 2,366,484 | Bradner | Jan. 2, 1945 |
| 2,526,012 | Feldmeier | Oct. 17, 1950 |
| 2,622,343 | Metcalfe | Dec. 23, 1952 |

FOREIGN PATENTS

| | | |
|---|---|---|
| 280,776 | Great Britain | Nov. 24, 1927 |